(12) United States Patent
Bernardi et al.

(10) Patent No.: US 8,788,673 B2
(45) Date of Patent: *Jul. 22, 2014

(54) SYSTEMS AND METHODS FOR PROVIDING SECURITY THROUGH SESSIONS

(75) Inventors: Ara Bernardi, Mercer Island, WA (US);
Klaus U. Schutz, Kirkland, WA (US);
Richard B. Ward, Redmond, WA (US);
Sriram Sampath, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1589 days.

This patent is subject to a terminal disclaimer.

(21) Appl. No.: 10/939,954

(22) Filed: Sep. 13, 2004

(65) Prior Publication Data

US 2006/0059529 A1    Mar. 16, 2006

(51) Int. Cl.
*G06F 15/16* (2006.01)

(52) U.S. Cl.
USPC .............. 709/227; 709/225; 709/229; 726/1; 726/2

(58) Field of Classification Search
USPC ......... 726/22, 23, 24, 25, 26, 34, 35, 1, 2, 16, 726/21
See application file for complete search history.

(56) References Cited

U.S. PATENT DOCUMENTS

| | | | |
|---|---|---|---|
| 5,638,448 A | 6/1997 | Nguyen | |
| 5,915,085 A | 6/1999 | Koved | |
| 6,823,460 B1* | 11/2004 | Hollander et al. | 726/3 |
| 6,938,085 B1 | 8/2005 | Belkin et al. | |
| 6,963,960 B2* | 11/2005 | Marinescu et al. | 711/165 |
| 7,143,437 B2* | 11/2006 | Royer et al. | 726/8 |
| 7,421,500 B2* | 9/2008 | Talwar et al. | 709/227 |
| 7,490,347 B1* | 2/2009 | Schneider et al. | 726/2 |
| 8,005,959 B2* | 8/2011 | Bernardi et al. | 709/227 |
| 2003/0018910 A1* | 1/2003 | Wert et al. | 713/200 |
| 2003/0159070 A1* | 8/2003 | Mayer et al. | 713/201 |
| 2004/0044866 A1* | 3/2004 | Casazza | 711/163 |
| 2004/0139351 A1* | 7/2004 | Tsang | 713/201 |
| 2005/0235139 A1* | 10/2005 | Hoghaug et al. | 713/2 |
| 2006/0041761 A1* | 2/2006 | Neumann et al. | 713/189 |
| 2006/0059529 A1* | 3/2006 | Bernardi et al. | 725/132 |

* cited by examiner

*Primary Examiner* — Dhairya A Patel
(74) *Attorney, Agent, or Firm* — Jim Sfekas; Kate Drakos; Micky Minhas (57) ABSTRACT

Systems and methods are described for providing security through sessions. In an implementation, a method includes initiating a session, by an operating system, in which operating system services are executable and initiating another session, by the operating system, in which a user-interactive application is executable.

37 Claims, 9 Drawing Sheets

SYSTEMS AND METHODS FOR PROVIDING SECURITY THROUGH SESSIONS

TECHNICAL FIELD

The present invention generally relates to the field of security and more particularly relates to systems and methods for providing security through sessions.

BACKGROUND

An operating system, when executed, may include a plurality of operating system services to perform system related functions. For example, operating system services may be configured to provide system-level support, such as a system event log, a task scheduler, telephony, and so on. Thus, operating system services may provide the "backbone" of an operating system and provide critical functionality to the execution of the operating system.

A variety of different type of operating system services may be executed on a computing device. A first type of operating system service is a non-interactive service which is configured for execution without user interaction. For instance, a non-interactive service may be executed without providing a user interface. A second type of operating system service is a user-interactive service that does provide for interaction with the user, such as by providing a user interface for interaction with the user.

Typically, operating system services are executed by the operating system in an elevated security context, such as "LocalSystem", and therefore have high privileges in the execution of the operating system. Privileges define rights to perform specific tasks. For example, a "high" privilege may define a right to perform tasks that affect operation of an entire computer system, while a "low" privilege may define a right to interact with a particular programming object. Because some operating system services are user-interactive, however, a malicious user may utilize the user-interactive services to run malicious code at a higher privilege than would otherwise be possible and therefore attack the operation of a computing device which executes the operating system.

An operating system, for instance, may provide an interactive desktop that acts as a security boundary such that any application executed on the interactive desktop can interact with any window that is provided on the interactive desktop, even if that window is invisible. Consequently, a user-interactive service that opens a window on the interactive desktop exposes itself to applications executed by any logged-on user, even a malicious user. For instance, a user-interactive service which provides a window in the interactive desktop may be utilized to elevate code written by the malicious user to the elevated security context of that service. As a result, the code, when elevated, may attack and take control of the user-interactive service to disrupt execution of the operating system.

Accordingly, there is a continuing need for systems and methods that afford security for operating system services provided through execution of an operating system.

SUMMARY

Systems and methods are described for providing security through sessions. The sessions may be utilized to isolate execution of different functionality of the computing device, one from another, to protect the operation of the computing device. For example, during the boot process of an operating system on a computing device, a first session and a second session may be initiated. The first session is configured to contain operating system services, while the second session is configured to contain one or more applications. The first and second sessions thereby isolate the operating system services from the one or more applications, thereby protecting the operating system services from attack. For instance, the first session may prohibit interactive user logon such that a malicious user cannot access the first session to interfere with the operating system services.

In another example, sessions may be utilized to provide multi-level security to a plurality of applications. Each of the plurality of applications, for instance, may have different security considerations for execution on a computing device. A session may be provided for each of the different applications such that each session provides access to the functionality of the computing device according to the differing security considerations. For instance, a first application may be configured to provide administrative functions on the computing device and therefore is executed in a first session which permits access to all of the functionality of the computing device. A second application may be obtained from a trustworthy source and therefore executed in a second session which permits access a portion of the functionality of the computing device that, while significant, is less than the portion permitted by the first session. A third application, on the other hand, may be obtained from an untrustworthy source, and therefore executed in a third session which provides restricted access to computing device functionality, thereby protecting against malicious use. In other words, the first session provides "higher" or "greater" access privileges for the computing device functionality that the second and third sessions. Likewise, the second session provides higher privileges than the third session, and so on. Thus, each session may be utilized to isolate the execution of the first, second, and third applications, one from another, to protect against an elevation of privilege attack that was made possible through concurrent execution of applications on an interactive desktop, as previously described.

BRIEF DESCRIPTION OF THE DRAWINGS

The same reference numbers are utilized in instances in the discussion to reference like structures and components.

DETAILED DESCRIPTION

Overview

System and methods are described for providing security through sessions. In an implementation, separate sessions are initiated by the operating system for execution of operating system services and for execution of applications. The execution of the operating system services in one session is isolated from the execution of the applications in another session.

The operating system services, for instance, may be executed in a first session that does not permit interactive user logon. An application which is user-interactive is executed in a second session that does permit interactive user logon. Hence, the application having a lower privilege (i.e., more restricted access to tasks capable of being performed by the operating system) cannot be executed in the first session to attack the higher-privileged operating system services. In this way, the first and second sessions may be utilized to protect against an attack from a malicious user that was previously made possible through execution of the operating system services and the applications on an interactive desktop. For instance, because the user's applications are executed in a different session from the higher-privileged operating system services, a malicious application may not attack a vulnerability existing in the higher privileged operating system service to gain elevation of privilege as was previously described.

Sessions may also be utilized to provide a variety of additional security functionality. For example, a plurality of sessions may be provided for execution of applications. Each session may be provided based on different security considerations in the execution of the respective applications. The operating system, for instance, may dynamically create a different security level for execution of a specific application by creating a new session. Each session may automatically contain the execution of the application in the session, thereby controlling permissible and non-permissible interaction of the application with other applications being executed in other session. For instance, the sessions may be linked through pre-defined channels which characterize permissible read/write access between applications being executed in the sessions. Thus, the execution of the applications may be controlled without requiring active monitoring of communications sent between the applications, thereby conserving hardware, software and network resources. Further discussion of the use of sessions and channels for execution of a plurality of applications may be found beginning in relation to FIG. 4.

Exemplary Environment

Figure 1:
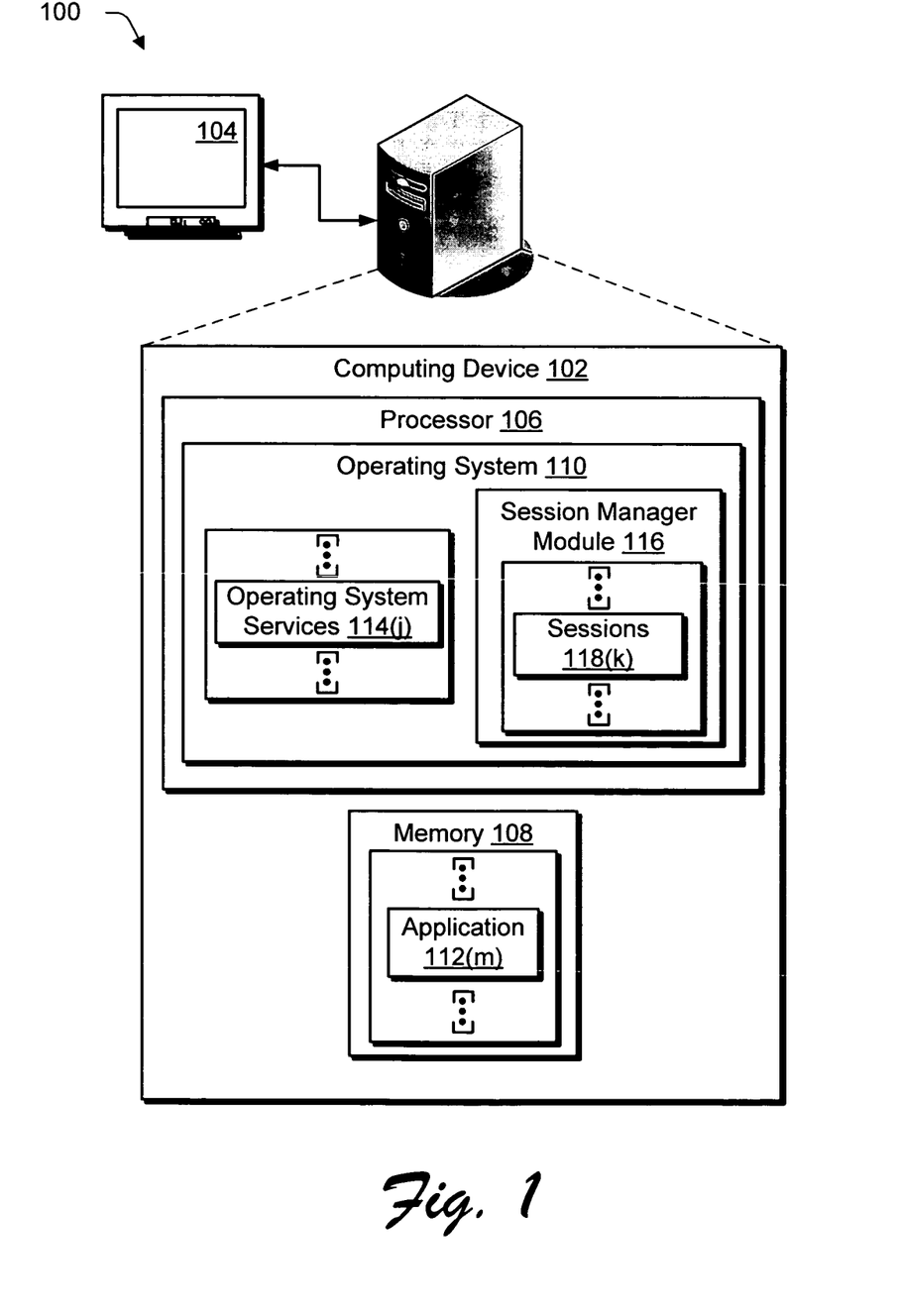
FIG. 1 is an illustration of an environment in an exemplary implementation which is operable to employ sessions which provide security for operating system services of an operating system.

FIG. 1 is an illustration of an environment 100 in an exemplary implementation which is operable to employ sessions which provide security for operating system services of an operating system. The environment 100 is illustrated as including a computing device 102 which is communicatively coupled to a display device 104. Although the computing device 102 is illustrated as a desktop personal computer (PC), the computing device 102 may be configured in a variety of ways, such as a set-top box, a notebook computer, a tablet PC, a personal digital assistance (PDA), an information appliance, a game console, a wireless phone, and so on. The computing device 102 may range from a full resource device with substantial memory and processor resources (e.g., PCs, television recorders equipped with hard disk) to a low-resource device with limited memory and/or processing resources (e.g., traditional set-top boxes). Although the display device 104 is illustrated as separate from the computing device 102, in another implementation the computing device 102 includes the display device 104, such as a wireless phone, a television having an integrated set-top box, and so forth.

The computing device 102 has a processor 106 and memory 108 (e.g., a computer-readable storage media). The processor 106 is not limited by the materials from which it is formed or the processing mechanisms employed therein. For example, the processor 106 may be formed from semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 108 is shown, a wide variety of types and combinations of memory may be employed, such as random access memory (RAM), hard disk memory, removable medium memory, and so forth.

An operating system 110 is illustrated as being executed on the processor 106 and is storable in memory 108. The operating system 110 is software (which may be provided by one or more modules) that controls the allocation and usage of hardware resources of the computing device 102, such as memory 108, processor 106, peripheral devices (e.g., the display device 104), and so on. The operating system 110 is foundation software on which programs, such as word processors, spreadsheets, browsers, and so on, may employ to access the hardware resources. For instance, the computing device 102 may include a plurality of applications 112(m), where "m" can be any integer from one through "M", which are illustrated as stored in memory 108 and are executable on the processor 106. Each of the plurality of applications 112(m) is executable to provide a variety of functionality to a user, such as a word processor, a spreadsheet, a browser, and so on. The operating system 110 may provide one or more application programming interfaces (APIs) which "hide" the details of allocation and usage of the hardware resources of the computing device 102 from the applications 112(m). In this way, a software developer that creates one or more of the plurality of applications 112(m) may write the applications 112(m) without having to be aware of the specific implementation details of the hardware which will be utilized to execute the applications 112(m).

As previously described, the operating system 110 may include a plurality of operating system services 114(j), where "j" can be any integer from one to "J". Each of the plurality of operating system services 114(j) (hereinafter "services") may be interactive or non-interactive. Non-interactive services are configured for execution without user interaction and therefore generally do not provide a user interface. User-interactive services, on the other hand, do provide for interaction with the user and therefore may include a user interface.

The operating system 110 includes a session manager module 116 (hereinafter "session manager") which is executable to provide a plurality of sessions 118(k), where "k" can be any integer from one to "K". Each of the sessions 118(k) may be configured to contain execution of one or more of the plurality of services 114(j), one or more of the plurality of applications 112(m), and so on. For instance, the operating system 110, when booting, may initiate a first one of the plurality of sessions 118(k) to contain the plurality of services 114(j) and another one of the plurality of sessions 118(k) to contain one or more of the applications 112(m). The sessions 118(k) isolate the execution of the plurality of services 114(j) from the applications 112(m), further discussion of which may be found beginning in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memory 108 as previously described. The features of the sessions described herein are platform-independent, meaning that the strategies may be implemented on a variety of commercial computing platforms having a variety of processors.

Figure 2:
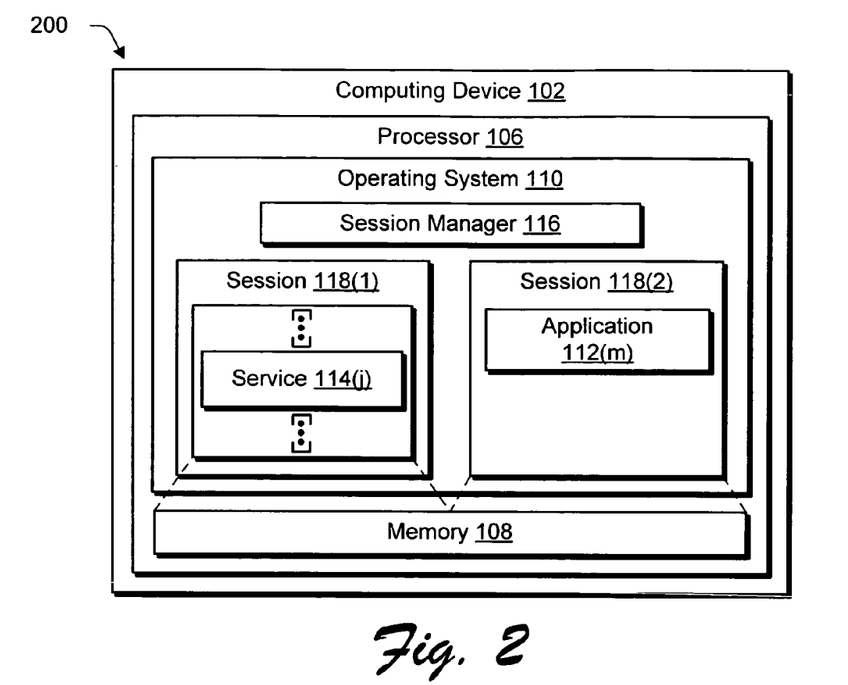
FIG. 2 is an illustration of an exemplary implementation showing a computing device of FIG. 1 having a plurality of sessions initiated through execution of a session manager for isolation of the plurality of operating system services from an application.

FIG. 2 is an illustration of an exemplary implementation 200 showing the computing device 102 of FIG. 1 having a plurality of sessions initiated through execution of the session manager 116 for isolation of the plurality of services 114(j) from the application 112(m). In FIG. 1, the plurality of sessions 118(k) were illustrated as within the session manager 116 to indicate that the session manager 116 is executable to initiate the plurality of sessions 118(k). Once initiated, however, the plurality of sessions 118(k) may be executed without interaction with the session manager 116.

The session manager 116, for instance, may be executed on the processor 106 during a boot process of the operating system 110 to initiate first and second sessions 118(1), 118(2). The first session 118(1), in this instance, is initiated to contain execution of the plurality of services 114(j), and the second session 118(2) is initiated to contain execution of the application 112(m). Although the first and second sessions 118(1), 118(2) are illustrated as executed on the processor 106, each of the sessions may also include a respective portion of the memory 108, which is illustrated through the use of dashed lines in FIG. 2. The respective portions of the memory 108 may be utilized to store data for processing and as a result of processing performed within the respective sessions. For example, the second session 118(2) may include an execution of the application 112(m), data contained in memory 108 for processing by the application 112(m), and data that was processed by the application 112(m).

In an implementation, applications, services and data within a session are accessible by other applications and services within that session. For example, one of the plurality of services 114(j) may be accessible by another one of the plurality of services 114(j) in the first session 118(1). Each of the plurality of services 114(j), however, are not directly accessible by the application 112(m) that is being executed in the second session 118(2). However, the application 112(m) can communicate with services 114(j) in the other session via InterProcessCommunication (IPC) paradigms like Remote Procedure Call (RPC), Local Procedure Call (LPC), and so on, to obtain desired data. Since the application 112(m) and services 114(j) do not share the same interactive desktop, however, communication of window messages and other desktop-level interactions are not possible. Thus, the first and second sessions 118(1), 118(2) provide isolation of the services 114(j) from the application 112(m), and vice versa. The services 114(j) may also be isolated, one from another, through the use of sessions, further discussion of which may be found in relation to the following figure.

Figure 3:
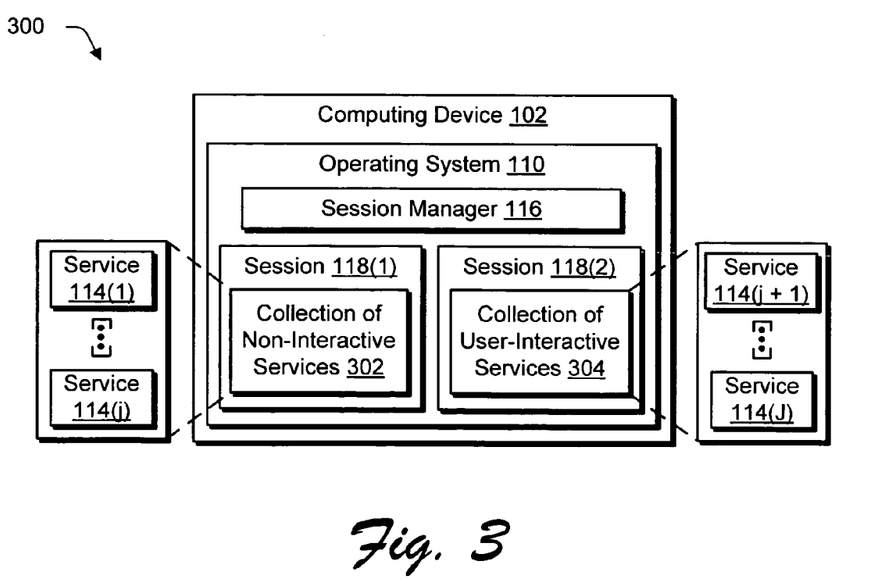
FIG. 3 is an illustration of an exemplary implementation showing the computing device of FIG. 1 having a plurality of sessions initiated through execution of the session manager for isolation of collections of operating system services, one from another.

FIG. 3 is an illustration of an exemplary implementation 300 showing the computing device 102 of FIG. 1 having a plurality of sessions initiated through execution of the session manager 116 for isolation of collections of services, one from another. In the previous implementation as described in relation to FIG. 2, the services 114(j) were isolated from the application 112(m) through the use of first and second sessions 118(1), 118(2). The first and second sessions 118(1), 118(2) may also be utilized to isolate services from each other.

The first session 118(1), for instance, may include a collection 302 of non-interactive services, which is illustrated in FIG. 3 as including services 118(1)-118(j). As previously described, non-interactive services are configured for execution without user interaction. For instance, a non-interactive service may be executed without providing a user interface, such as a corresponding window on a desktop. The second session 118(2) includes a collection 304 of user-interactive services, which is illustrated in FIG. 3 as including services 114(j+1)-114(J). The user-interactive services 114(j+1)-114(J) may provide a user interface for user interaction, such as by providing a window on a desktop. By separating the user-interactive services 114(1)-114(j) from the non-interactive services 114(j+1)-114(J), the first and second sessions 118(1), 118(2) protect the non-interactive services 114(1)-114(j) from access by a malicious user via the user-interactive services 114(j+1)-114(J).

Figure 4:
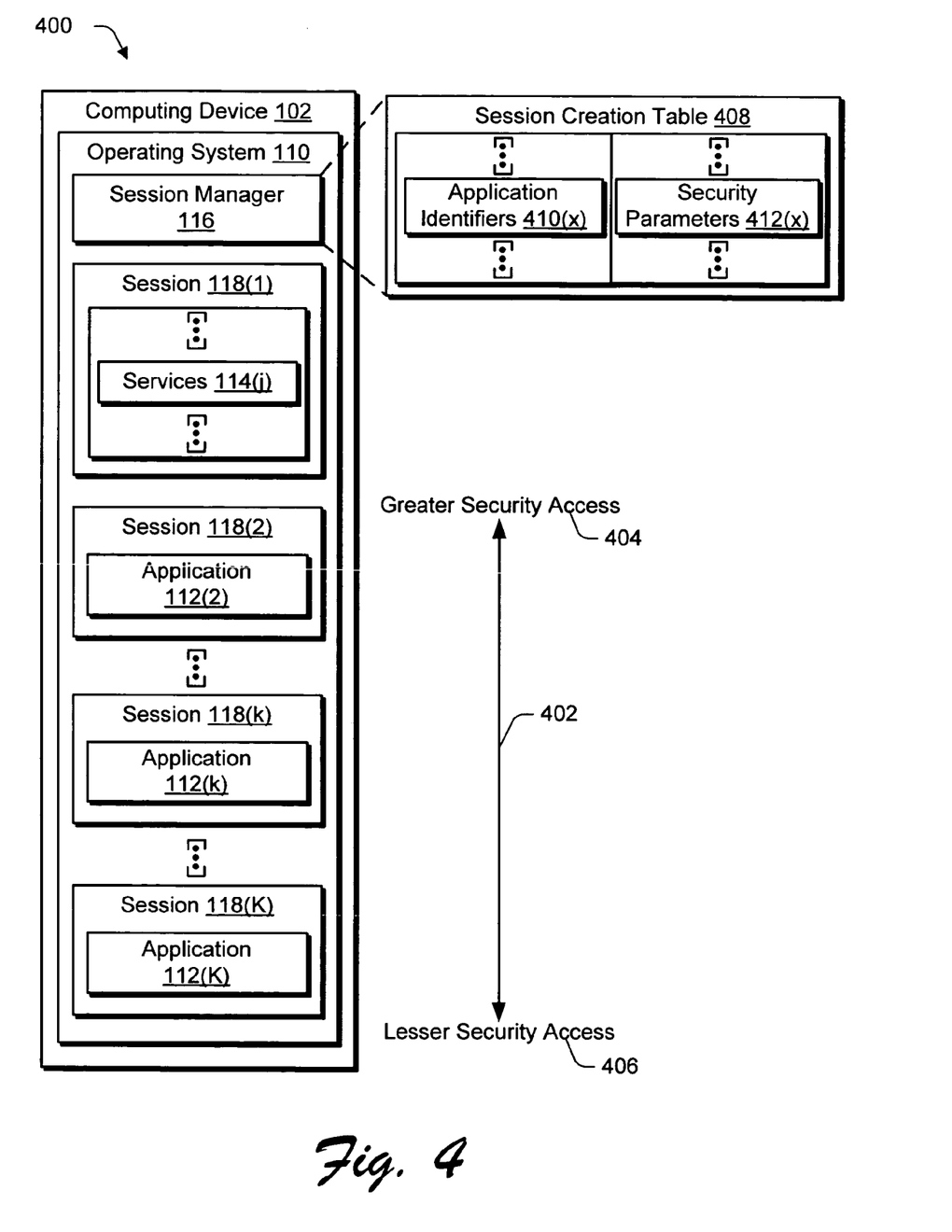
FIG. 4 is an illustration in an exemplary implementation showing the computing device of FIG. 1 as executing the session manager to initiate a plurality of sessions for applications based on security considerations for the respective applications.

FIG. 4 is an illustration in an exemplary implementation 400 showing the computing device 102 of FIG. 1 as executing the session manager 116 to initiate a plurality of sessions for applications based on security considerations for the respective applications. In the previous implementation as described in relation to FIG. 2, the services 114(j ) were isolated from the application 112(m) through the use of first and second sessions 118(1), 118(2) whereas in the implementation described in relation to FIG. 3, services were isolated from each other. Sessions 118(1)-118(K) may also be utilized to isolate applications from each other as well as from the services 114(j).

The plurality of sessions 118(2)-118(K) may be utilized to provide multi-level security for execution of the corresponding applications 112(2)-112(K). Multi-level security refers to the classification of data, such as into hierarchical levels (e.g., restricted, secret, top-secret, and so on), groupings (e.g., "Operation Overlord"), and so on. For example, multi-level security may be utilized to provide mandatory access control (MAC) to enforce security classification and releasability of data, such as to control data flow between levels, groupings, and so on.

The computing device 102, for instance, may execute the session manager 116 to initiate a plurality of sessions 118(1)-118(K). During boot of the operating system 110, for example, the session manager 116 may be executed to create a session 118(1) for containing execution of the services 114(j) and a session 118(2) for containing an execution of an application 112(2). The session manager 116 may also be executed to provide multi-level security for a plurality of applications 112(2), ..., 112(k), ..., 112(K) through respective sessions 118(2), ..., 118(k), ..., 118(K). For instance, the plurality of sessions 118(2)-118(K) may provide a hierarchy based on security considerations of the respective applications 112(2)-112(K). The hierarchy 402 is illustrated through use of an arrow such that session 118(2) has greater security access 404 (e.g., access to a greater portion of the functionality of the computing device 102) that session 118(k), which has lesser security access 406. In FIG. 4, parentheticals are utilized to indicate correspondence of the applications with their respective sessions, such as application 112(2) and session 118(2), and so on.

The session manager 116 may expose internal application programming interfaces (APIs) to other operating system 110 modules to dynamically create new sessions and start new applications in the newly created session. For example, the operating system 110, through execution of the session manager 116, may create session 118(k) for application 112(k) to isolate application 112(k) in its own "container" from the other applications (e.g., applications 112(2), 112(k)) being executed on the computing device 102.

The session manager 116 may determine whether to initiate a new session in a variety of ways. For example, the session manager 116 may access a session creation table 408 which includes a plurality of application identifiers 410(x), where "x" can be any integer from one to "X", which are utilized to locate corresponding one of a plurality of security parameters 412(x). For example, the session manager 116 may receive a request to initiate an application and find a corresponding one of the plurality of applications identifiers 410(x) in the session creation table 408 to locate the security parameters 412(x) for that application. The session manager 116 may then utilize the located security parameters 412(x) to determine whether to create a new session for the application, execute the application in a pre-existing session, and so on. Although execution of the session manager 116 to make the determination has been described, this functionality may be provided separately by another component, such as an operating system component referred to as a "kernel" to execute a module called "CreateProcess". For instance, based on the determination made through execution of the "CreateProcess" module, the kernel may call the session manager 116 to cause the new session to be created. Further discussion of creation of a session based on security considerations of an application may be found in relation to FIG. 9.

In an implementation, the session manager 116 may create the session 118(k) as a "child" from a parent session (e.g., session 118(2)). The parent/child session relationship may provide a variety of functionality. For instance, a parent/child session relationship between sessions 118(2), 118(k) may be utilized such that execution of the application 112(k) in session 118(k) is synchronized with execution of the application 112(2) in session 118(2), a logoff initiated in either of the sessions 118(2), 118(k) is effective the other one of the sessions 118(2), 118(k), and so on.

Figure 5:
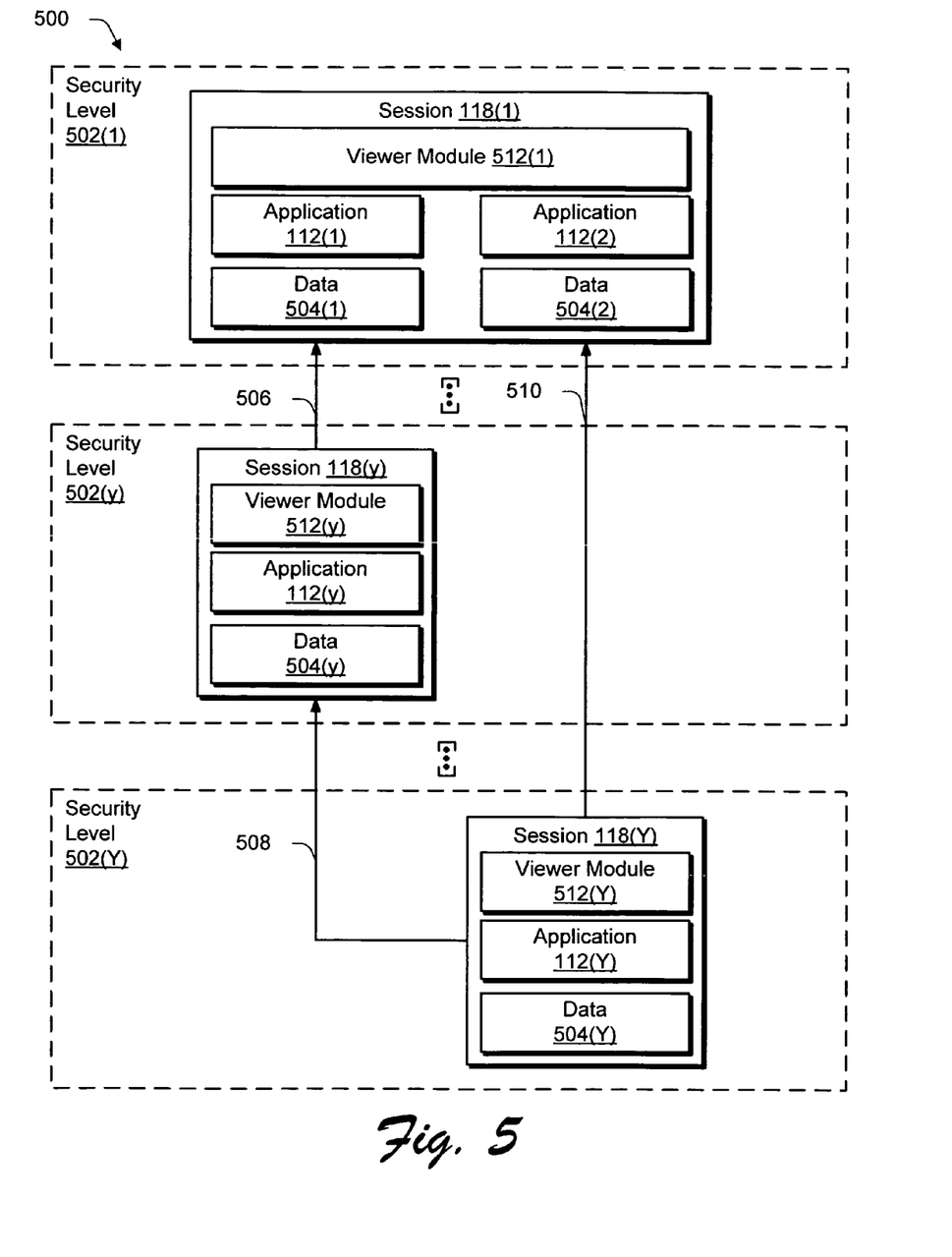
FIG. 5 is an illustration of an exemplary implementation showing a system having a plurality of security levels each of which being provided by a respective one of a plurality of sessions.

FIG. 5 is an illustration of an exemplary implementation showing a system 500 having a plurality of security levels 502(1), ..., 502(y), ..., 502(Y), each of which being provided by a respective one of a plurality of sessions 118(1), ..., 118(y), ..., 118(Y). Each of the plurality of security levels 118(1)-118(Y) is configured to contain applications and data that may be accessed accordingly to the constraints defined for the respective security levels 502(1)-502(Y). For example, session 118(1) is illustrated as including applications 112(1), 112(2) and respective data 504(1), 504(2), session 118(y) is illustrated as including application 112(y) and data 504(y), and session 118(y) is illustrated as including application 112(Y) and data 504(Y). Users may be given access rights in compliance with a respective one of the plurality of security levels 502(1)-502(Y) by "logging on" to a respective one of the sessions 118(1)-118(Y).

Security level 502(1), for example, may be configured as a hierarchical level in a multi-level security system for "top secret" access to applications 112(1), 112(2) and data 504(1), 504(2). Security level 502(y) is configured as another hierarchical level for "secret" access to applications 112(y) and data 504(y). Likewise, security level 502(Y) is configured as an additional hierarchical level for "confidential" access to applications 112(Y) and data 504(Y). Therefore, a user that logs on to session 118(1) has "top secret" access to the applications 112(1), 112(2) and data 504(1), 504(2) included at that security level 502(1).

To provide access to applications and data contained in other sessions, a plurality of channels 506, 508, 510 are included in the system 500 which define permissible data flow between the sessions 118(1)-118(Y). The plurality of channels 506-510 are illustrated as arrows in FIG. 5 which indicate the permissible direction that data may flow between sessions 118(1)-118(Y). For example, channel 506, located between sessions 118(1), 118(y), indicates that data may flow from session 118(y) to session 118(1), but not the other way. Application 112(1), for instance, may have "read access" to the application 112(y) and data 504(y) contained in session 118(y), but cannot write data to the session 118(y). Therefore, a user utilizing application 112(1) may access the application 112(y) and data 504(y) in the session 118(y) for processing, but may only store a result of the processing in session 118(1). Thus, in this example, the processed data remains in that session 118(1), thereby preserving the "top secret" nature of data processed in the session 118(1). Likewise, channel 508 may be utilized to provide access from session 118(y) to session 118(Y) and channel 510 may be utilized to provide access from session 118(1) to session 118(Y). In an implementation, the channels are configured such that data may not flow between multiple sessions to a destination session. For example, session 118(1) may access session 118(y) through channel 506, but may not access session 118(Y) through channel 508. Therefore, channel 510 is provided to permit such access from session 118(1) to session 118(Y). In another implementation, data flow between multiple sessions is permissible such that session 118(1) may access session 118(Y) through session 118(y) by utilizing channels 506, 508.

The channels 506-510 may be configured to automatically route data between sessions 118(1)-118(Y) without requiring active monitoring to protect against impermissible dissemination of data as was previously required utilizing traditional techniques. For instance, when data (e.g., messages) were sent between users utilizing traditional techniques, the messages were monitored to ensure that the transfer of the message was permitted. However, in the current implementation, such monitoring is not needed because the channels 506-510 define permissible transfer of data. Therefore, the channels 506-510 may be utilized to route the data without requiring active monitoring of the data. Active monitoring, however, may still be performed such that the channels do not serve as a "backdoor" for interchanging messages which are not permissible.

A variety of techniques may be utilized by the sessions 118(1)-118(Y) to provide isolation, one from another. For example, each of the plurality of sessions 118(1)-118(Y) may include a respective one of a plurality of viewer modules 512(1), ..., 512(y), ..., 512(Y). Each of the viewer modules 512(1)-512(Y) is responsible for user interaction with the sessions 118(1)-118(Y), such as by performing windows management, reading inputs from input devices, rendering graphics, and so on. Since each session 118(1)-118(Y) has its own instance of the viewer module 512(1)-512(Y), a separation (i.e., isolation) is provided between one session and another, thereby providing a security boundary between sessions. For instance, session 118(y) is not able to read inputs associated with session 118(1), application 112(Y) is not able to communicate with application 118(y) by sending a window message, and so on. In another implementation, the viewer modules 512(1)-512(Y) are executed in a parent session and are able to display data from a child session, an example of which is shown in the following figure.

Figure 6:
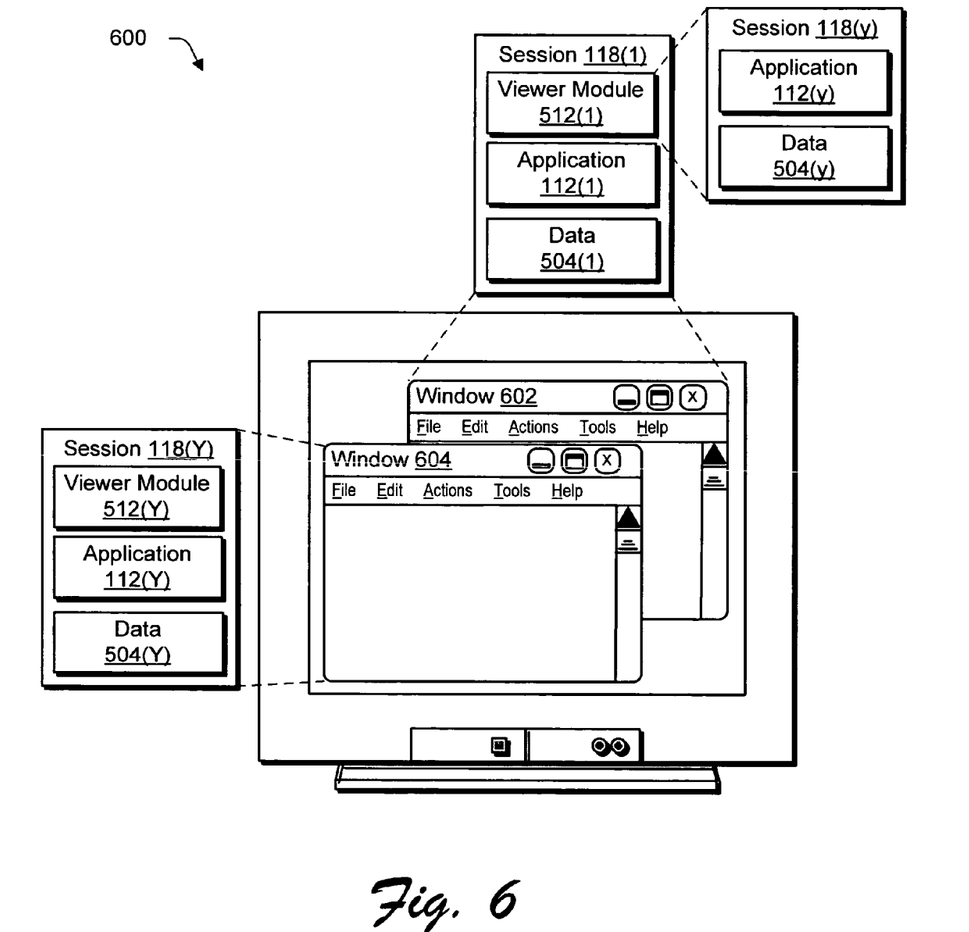
FIG. 6 is an illustration in an exemplary implementation showing the display device of FIG. 1 having a plurality of windows which are controlled through execution of a plurality of viewer modules of FIG. 5.

FIG. 6 is an illustration in an exemplary implementation 600 showing the display device 104 of FIG. 1 having a plurality of windows 602, 604 which are supplied, respectively, through execution of the viewer modules 512(1), 512(Y) of FIG. 5. Window 602 is illustrated through the use of phantom lines as being provided by session 118(1), and more particularly the execution of the viewer module 512(1). Therefore, the application 112(1) and data 504(1) may be displayed by the viewer module 512(1) in window 602 for interaction by a user.

Additionally, because session 118(1) can access session 118(y) via channel 506 of FIG. 5, the viewer module 512(1) may also be executed to display application 112(y) and data 504(y) from session 118(y). Thus, the viewer module 512(1) may display data 504(y) from a child session (e.g., session 118(y)). Since session 118(Y) does not have access to any other session, the viewer module 512(Y) of session 118(Y) provides window 604 for user interaction with the application 112(Y) and data 504(Y) from that particular session 118(Y). Although isolation provided through execution of separate viewer modules for each session has been described, a variety of other techniques may also be utilized to provide isolation between sessions 118(1)-118(Y), such as unique object namespaces, use of a different networking stack for each session, and so forth.

Figure 7:
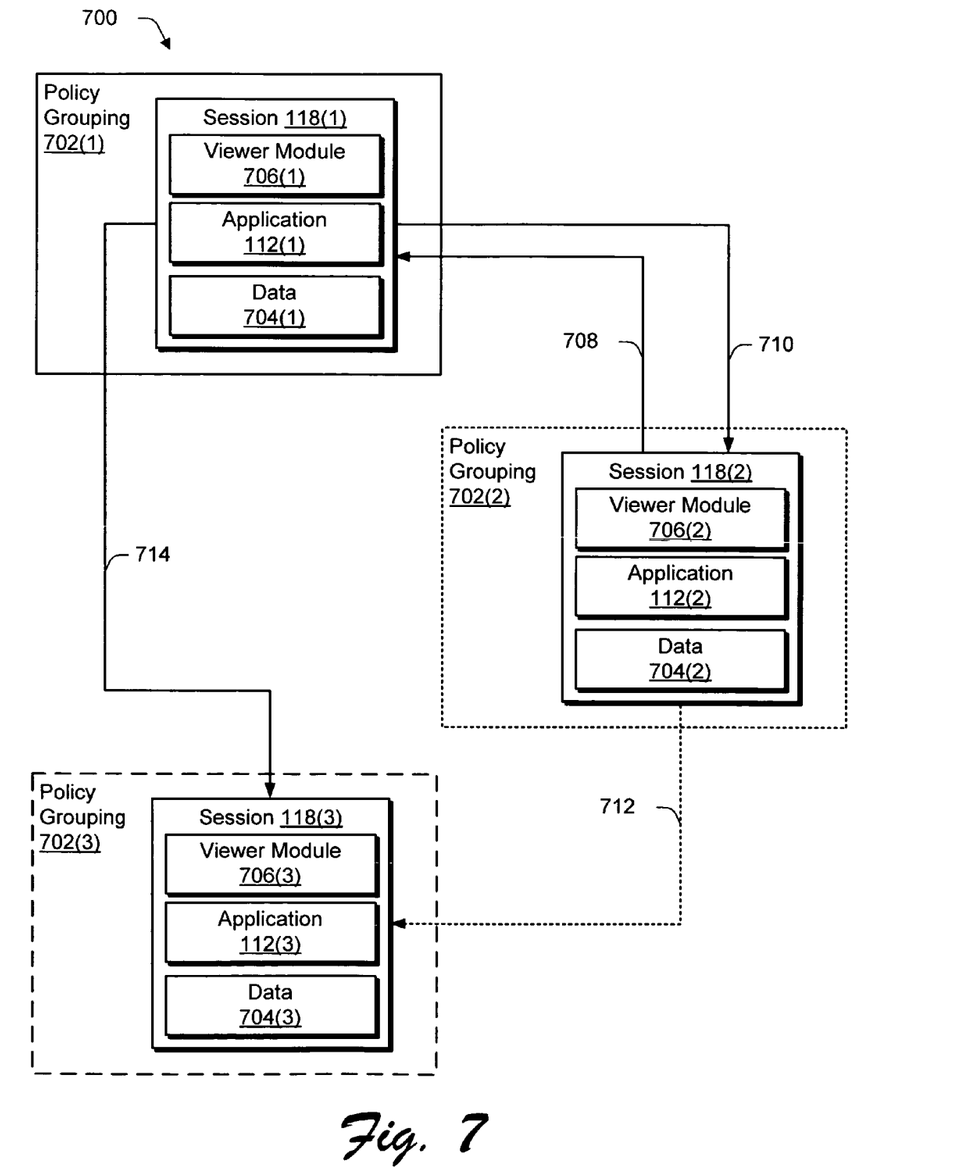
FIG. 7 is an illustration of an exemplary implementation showing a system having a plurality of policy groupings, each of which being provided by a respective one of a plurality of sessions.

FIG. 7 is an illustration of an exemplary implementation showing a system 700 having a plurality of policy groupings 702(1), 702(2), 702(3), each of which being provided by a respective one of a plurality of sessions 118(1), 118(2), 118 (3). In the system 500 previously described in relation to FIG. 5, hierarchical security levels were described which were provided through a plurality of sessions. A variety of other technique may also be utilized to provide multi-level security, such as by utilizing policy groupings 702(1), 702(2), 702(3), which may be defined to configure the system 700 to address a variety of security considerations.

The system 700, for example, may be configured for use in a hospital to address the Health Insurance Portability and Accountability Act of 1997 (hereinafter "HIPAA"). HIPAA specifies a set of standards to protect dissemination of patient information, such as by defining permissible uses for patient information. The system 700 may be configured such that the sessions 118(1)-118(3) are interconnected in accordance with HIPAA to provide permissible access to data.

Session 118(1), for instance, is configured according to a policy grouping 702(1) for doctors. The session 118(1) may include an application 112(1) configured to chart patient data, which is then stored as data 704(1). Session 118(2) is configured according to another policy grouping 702(2) for a pharmacy, which includes an application 112(2) which is executable to process prescriptions and data 704(2) containing patient prescriptions and available pharmaceuticals. Session 118(3) is configured according to a policy grouping 702(3) for a finance department, and includes an application 112(3) which is executable to process billing information and data 704(3) describing costs of services. Each of the sessions 118(1)-118(3) includes a respective viewer module 706(1)-706(3), which is executable to provide interaction with a user that is "logged on" to the respective session 118(1)-118(3).

The sessions 118(1)-118(3) are interconnected via a plurality of channels 708-714. As previously described, the channels 708-714 define permissible data flow in the system 700. For example, channels 708, 710, 714 are illustrated as solid lines which correspond to the solid line of the policy grouping 702(1) and channel 712 is illustrated a finely-dashed line which corresponds to the finely-dashed line of policy grouping 702(2). Session 702(1) has both read and write access to session 118(2) as illustrated by the respective channels 708, 710. Therefore, a doctor, when logged on to the session 118 (1), may access the application 112(2) and data 704(2) of the session 118(2), such as to write a prescription and read which pharmaceuticals are available. Session 118(2), however, does not have access to the session 118(1), and therefore cannot obtain patient data written by the doctor in the session 118(1). Sessions 118(1), 118(2) both have write access to session 118(3) via respective channels 712, 714 to provide billing information for processing by the finance department. In this way, the plurality of sessions 118(1)-118(3) are configured to provide access to applications 112(1)-112(3) and data 704 (1)-704(3) according to policy groupings 702(1)-702(3). Although policy groupings that were configured to define permissible dissemination of patent data were described, the policy groupings may be configured to provide security of data and application access for a variety of other settings, such as network access for company employees, and so on.

Exemplary Procedures

The following discussion describes sessions that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 8:
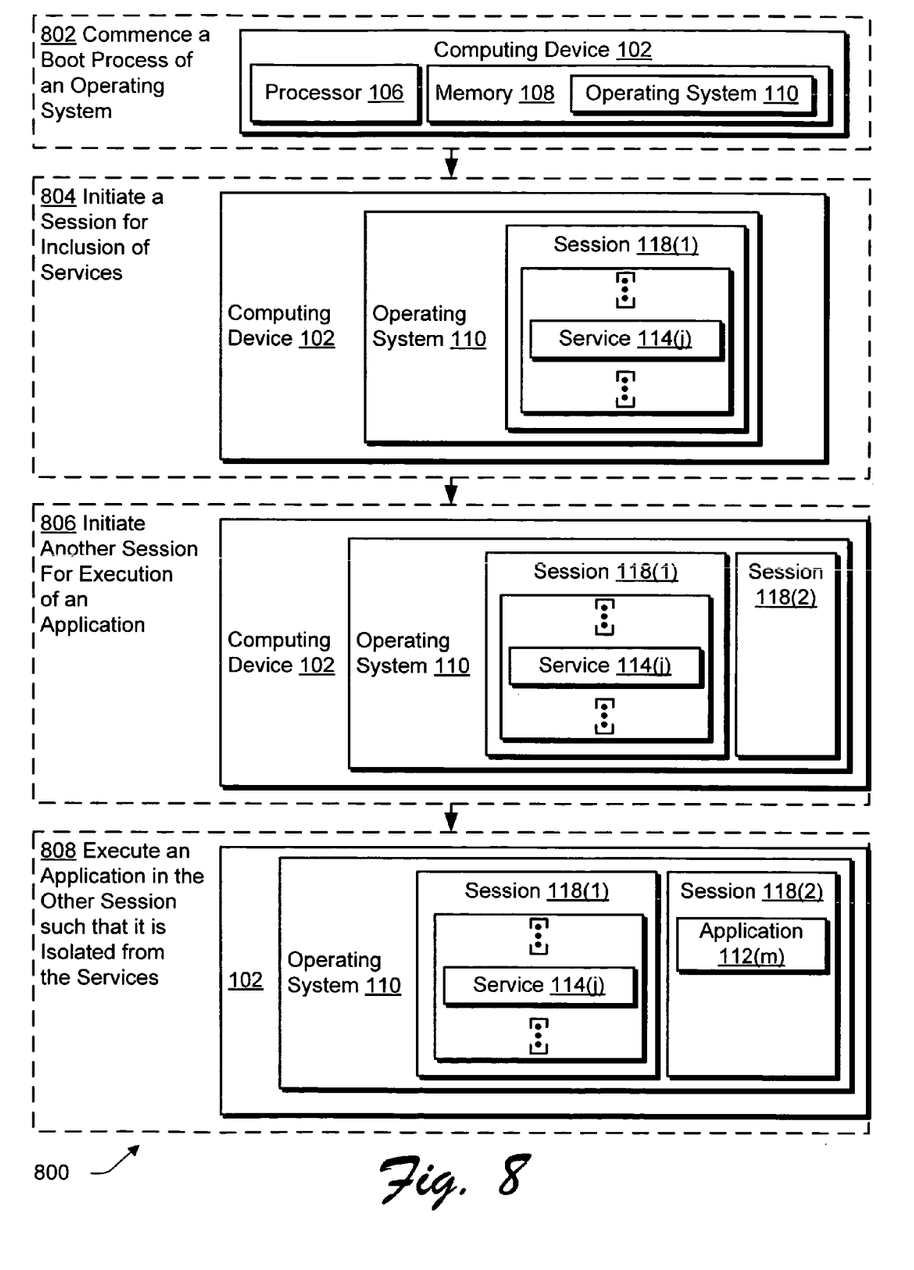
FIG. 8 is a flow diagram depicting a procedure in an exemplary implementation in which first and second sessions are initiated during a boot process of an operating system.

FIG. 8 is a flow diagram depicting a procedure 800 in an exemplary implementation in which first and second session are initiated during a boot process of an operating system. A boot process of an operating system 110 is commenced on a computing device 102 (block 802). For example, the operating system 110 may be read from memory 108 for execution on the processor 106.

In response to the commencement of the operating system 110, a session 118(1) is initiated for inclusion of a plurality of services 114(j) (block 804). For instance, the session 118(1) may be executed to include services which are non-interactive. In another instance, the session 118(1) is executed to include both user-interactive and non-interactive services.

Another session 118(2) is also initiated for containing execution of an application (block 806). For example, the other session 118(2) is illustrated in FIG. 8 as apart from session 118(1) and the services 114(j) contained therein. The application 112(m) is then executed in the other session 118 (2) such that it is isolated from the services 114(j) which are executable in session 118(1) (block 808). In an implementation, the initiating of the session 118(1) and the other session 118(2) is performed during the boot process of the operating system 110 on the computing device 102.

Figure 9:
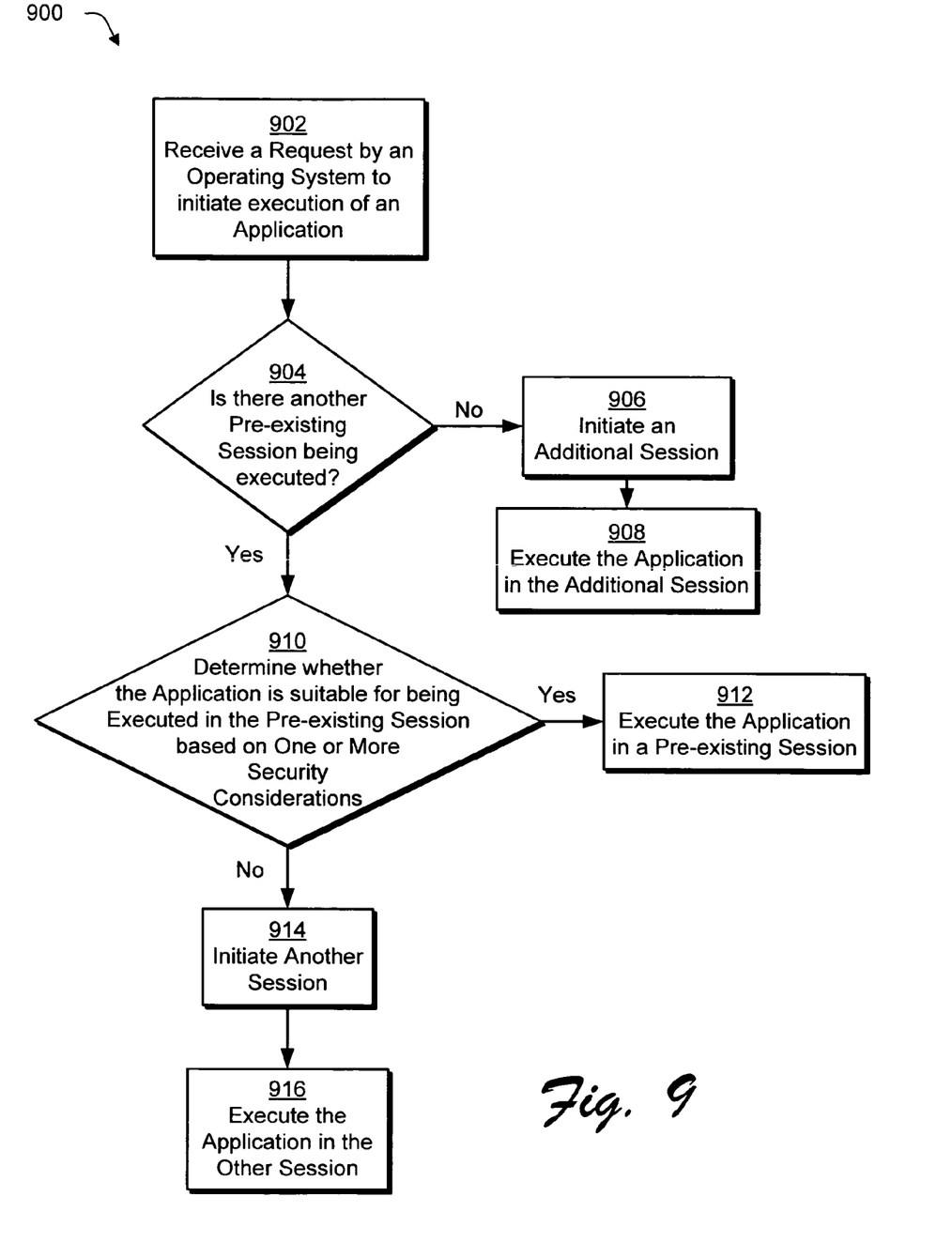
FIG. 9 is a flow diagram depicting a procedure in an exemplary implementation in which a determination is made as to whether a session should be initiated to contain an execution of an application.

FIG. 9 is a flow diagram depicting a procedure 900 in an exemplary implementation in which a determination is made as to whether a session should be initiated to contain an execution of an application. A request is received by an operating system to initiate execution of an application (block 902). For example, the operating system may receive an input from a user via an input device to execute the application. As previously described, the operating system may transfer the request via an internal API to a session manager to initiate the execution of the session. In this implementation, the operating system was already booted on a computing device such that the services are executed in a session, previously initiated by the session manager, which does not accept user logon.

A determination is then made as to whether there is another pre-existing session being executed (decision block 904) that is suitable for containing the execution of the application. For example, the session manager may have been previously executed to initiate the other session for containing an execution of another application. As previously described, the other session may be utilized to isolate the services from the execution of the other application.

If there is not another pre-existing session (decision block 904), the session manager is executed to initiate an additional session (block 906), in which, the application is then executed (block 908). Thus, if there is not another session which is suitable for containing execution of the application (i.e., a session other than the session which contains the services), the session manager is automatically executed to generate such a session.

If there is another pre-existing session (decision block 904), a determination is made as to whether the application is suitable for being executed in the pre-existing session based on one or more security considerations (decision block 910). For example, the session manager may access a database, such as the session creation table 408 of FIG. 4, to determine which privileges should be given to the application to access software and hardware resources of the computing device. A first application, for instance, may be provided from a trusted source that has a significant amount of included security procedures which protect the first application from tampering. A second application, on the other hand, may be downloaded from an untrustworthy website. Different sessions may be provided which supply various degrees of access to the resources of the computing device according to the respective security considerations. Therefore, the determination may be made based on whether the pre-existing session addresses the security considerations of the application (decision block 910), and if so, the application is executed in the pre-existing session (block 912). If the pre-existing session does not address the security considerations of the application (decision block 910), another session is initiated by the session manager (block 914) which does address the security considerations. For example, the other session may be configured to provide nearly-unlimited access to an administrative application that is indicated by an administrator of the computing device as trustworthy. The application may then be executed in the other session (block 916). Thus, in this example three sessions may be provided, a first session for execution of the services, a second session for execution of a pre-existing application which addresses security considerations of the pre-existing application, and a third session for execution of the requested application which addresses the security considerations of the requested application. In this way, the session may be provided to isolate the services from the applications and also provide multi-level security for the execution of the applications.

Figure 10:
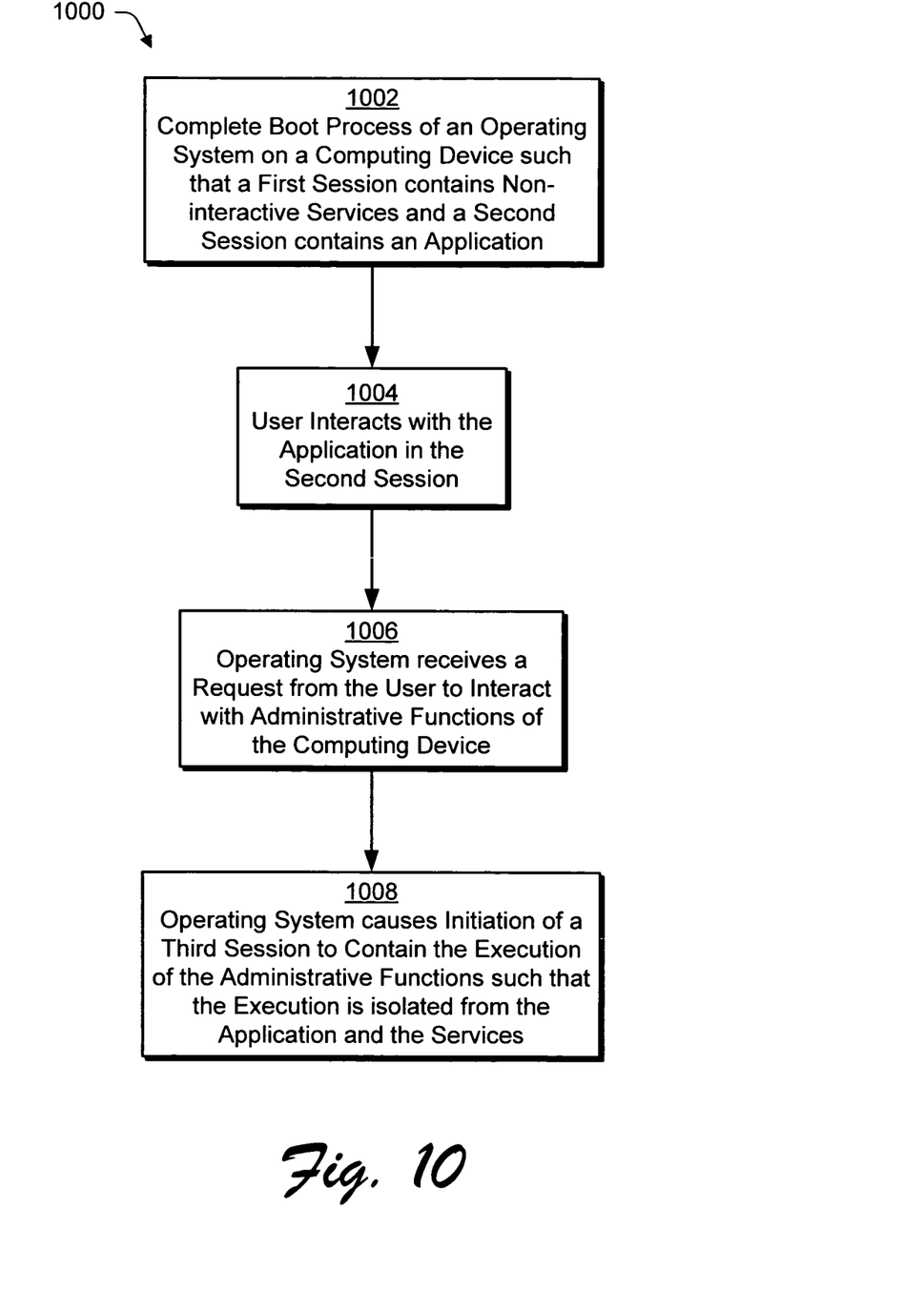
FIG. 10 is a flow diagram depicting a procedure in an exemplary implementation in which a session is initiated for protection of administrative functions of a computing device.

FIG. 10 is a flow diagram depicting a procedure 1000 in an exemplary implementation in which a session is initiated for protection of administrative functions of a computing device. A boot process for an operating system on a computing device is commenced and completed such that a first session contains non-interactive services and a second session contains an application (block 1002). In another implementation, the second session also contains user-interactive services such that the non-interactive services of the first session are isolated from the user-interactive services of the second session.

A user then interacts with the application in the second session (block 1004), such as to read email, browse the Internet, generate a document, and so on. During the user's interaction with the application, the user may decide to access administrative functions of the computing device. For example, the user may be a network administrator in charge of the functioning of a network that includes the computing device. While reading an email, the user may notice that the computing device is not functioning properly, which may require that the user access administrative functions of the computing device to correct the malfunction. Therefore, the user may utilize an input device to request initiation of the administrative functions on the computing device.

The operating system may then receive the request from the user to interact with the administrative functions of the computing device (block 1006). In response to the request, the operating system causes initiation of a third session to contain the execution of the administrative functions such that the execution thereof is isolated from application and the services (block 1008). For instance, the administrative functions may have greater access privileges to the resources of the computing device to administer operation of software on the computing device. To protect the administrative functions from attack by a malicious user and/or malicious code, the administrative functions are given their own session separate from the sessions utilized to contain the applications. Thus, the user may utilize both the administrative functions and the other application on the computing device, yet still protect the execution of the administrative functions.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    initiating a first session on a computing device, by an operating system, operating system services being executable in the first session;
    initiating a second session on the computing device, by the operating system, a first user-interactive application being executable in the second session, the first user-interactive application having a first set of security considerations; and
    initiating a subsequent session on the computing device, by the operating system, a second user-interactive application being executable in the subsequent session, the second user-interactive application having a different set of security considerations than the first user-interactive application; and
    wherein the first session, the second session, and the subsequent session are configured to each provide a different security functionality by controlling permissible and non-permissible interaction between each of the service of the first session, the application in the second session, and the application in the subsequent session.

2. A method as described in claim 1, wherein the subsequent session is isolated from a previous session.

3. A method as described in claim 1, wherein the second session and the subsequent session are provided access to an interactive operating system service according to the respective security considerations of the user-interactive applications.

4. A method as described in claim 1, wherein other operating system services, which are interactive, are executable in the second session.

5. A method as described in claim 1, wherein the first session is configured to exclude interactive logon by a user to the first session.

6. A method as described in claim 1, wherein the initiating of the first session, the second session, and the subsequent session is performed on the computing device that executes the operating system.

7. A method as described in claim 1, wherein the initiating of the second session and the subsequent session is performed automatically by the operating system in response to respective requests to initiate the first user-interactive application and the second user-interactive application.

8. A method as described in claim 1, wherein the initiating of the first session and the initiating of the second session are performed while booting the operating system on a computer.

9. The method as described in claim 1, the acts further comprising:
receiving a request to execute a third user-interactive application;
determining whether the third user-interactive application complies with at least one of respective sets of security considerations of the second session and the subsequent session; and
in response to determining that the third user-interactive application does not comply with at least one of respective sets of security considerations of the second session and the subsequent session:
creating a new session comprising a set of security considerations that with which the user-interactive third application complies, the new session being created on the computing device, and
executing the third user-interactive application in the new session.

10. The method as described in claim 1, wherein controlling permissible and non-permissible interaction between each of the service of the first session, the application in the second session, and the application in the subsequent session comprises employing a channel that defines a permissible transfer of data between a plurality of sessions comprising the first session, the second session, and the subsequent session, the channel protecting the plurality of sessions against impermissible transfer of data between the plurality of sessions.

11. A method comprising on a computer:
commencing a boot process of an operating system;
in response to the commencing, initiating a first session on the computer for:
inclusion of operating system services; and
isolation of the operating system services from a user-interactive application that is executable in another session according to a set of security considerations;
initiating a subsequent session on the computer when a requested user-interactive application has security considerations that differ from the security considerations of the user-interactive application executable in the another session; and
controlling permissible and non-permissible interaction of each of the operating system services, the user-interactive application and the requested user-interactive application with other applications and/or services executed in other sessions.

12. A method as described in claim 11, wherein the operating system services are non-interactive.

13. A method as described in claim 11, wherein:
the operating system services are non-interactive; and
the another session is configured to include other operating system services.

14. A method as described in claim 13, wherein the other operating system services are interactive.

15. A method as described in claim 11, wherein the first session is configured to exclude interactive logon by a user.

16. A method as described in claim 11, wherein the another session is a child of the first session.

17. A method as described in claim 11, wherein the subsequent session is a child of a pre-existing session.

18. A method as described in claim 11, wherein the initiating of the first session and initiating of the another session are performed during the boot process of the operating system on the computer.

19. A computer comprising:
a processor; and
memory configured to maintain an operating system that is executable on the processor to initiate a plurality of sessions on the computer, the plurality of sessions controlling isolation and permissible and non-permissible interaction among services and applications in the plurality of sessions, wherein the plurality of sessions comprises:
a first session, on the computer, in which operating system services are executable; and
a second session, on the computer, in which a first application having a set of security considerations is executable; and
a subsequent session, on the computer, in which a second application, having a different set of security considerations than the security considerations of the first application, is executable; wherein:
the first session isolates the operating system services from the first application in the second session and the second application in the subsequent session, and
the second session and the subsequent sessions control permissible and non-permissible interaction between the first application in the second session and the second application in the subsequent session.

20. A computer as described in claim 19, wherein the subsequent session is isolated from one or more previous sessions.

21. A computer as described in claim 19, wherein the first session is configured to exclude interactive logon by a user.

22. A computer as described in claim 19, wherein the subsequent session is a child of a previous session.

23. A computer as described in claim 19, wherein the second session and the subsequent session are provided access to a computer resource according to the respective security considerations.

24. A computer as described in claim 19, wherein the first and second sessions are initiated while the operating system is booted.

25. A computing device comprising a processor and a memory configured to maintain an operating system that is executable on the processor to initiate sessions comprising:
a first session containing operating system services on the computing device,
a second session containing an interactive application on the computing device, the second session being associated with a set of security considerations, and
a third session containing another interactive application on the computing device, the third session being associated with another set of security considerations which are different from the set of security considerations, wherein the first session isolates the operating system services from the interactive application and the other interactive application, and wherein the second session and the third session control permissible and non-permissible interaction between the interactive application in the second session and the other interactive application in the third session.

26. A computing device as described in claim 25, wherein the operating system services are non-interactive.

27. A computing device as described in claim 25, wherein other operating system services, which are interactive, are executable in the second session according to the set of security considerations.

28. A computing device as described in claim 25, wherein the first session is configured to exclude interactive logon by a user.

29. A computing device as described in claim 25, wherein the second session is a child of a previous session.

30. A computing device as described in claim 25, wherein the first session, the second session, and the third session are initiated in the operating system providing the operating system services.

31. A computing device as described in claim 25, wherein the second session is initiated automatically in response to a request to initiate the interactive application.

32. A computing device as described in claim 30, wherein the first and second sessions are configured to be initiated while booting the operating system that provides the operating system services.

33. A system comprising:
one or more processors; and
memory storing instructions executable by the one or more processors to implement acts comprising:
initiating a first session in which operating system services are executable;
initiating a second session in which a first user-interactive application is executable;
initiating a third session in which a second user-interactive application is executable;
isolating the operating system services in the first session from the first user-interactive application in the second session and the second user-interactive application in the third session;
controlling permissible and non-permissible interaction between the first user-interactive application in the second session and the second user-interactive application in the third session;
receiving a request to execute a third application in a current session;
determining whether the third application complies with at least one of a first set of security considerations of the second session and a second set of security considerations of the third session; and
in response to determining that the third application does not comply with at least one of the first set of security considerations of the second session or the second set of security considerations of the third session, executing the third application in another session having security considerations different from the second session and the third session.

34. The system as described in claim 33, the acts further comprising:
determining whether the third application complies with a set of security considerations of a pre-existing session different from the second session and the third session; and in response to determining that the third application complies with the set of security considerations of the pre-existing session, executing the third application in the pre-existing session, the pre-existing session comprising the another session.

35. The system as described in claim 33, the acts further comprising:
determining whether the third application complies with a set of security considerations of a pre-existing session different from the second session and the third session; and
in response to determining that the third application does not comply with the set of security considerations of the pre-existing session, creating a new session different from the second session, the third session, and the pre-existing session, and executing the application in the new session, the new session comprising the another session.

36. A memory device comprising computer executable instructions that, when executed on a computing device, direct the computing device to perform acts comprising:
initiating a first session on the computing device, the first session comprising a first application and a first set of security considerations;
creating a second session from the first session on the computing device, the second session having a child-parent relationship with the first session and comprising a second application and a second set of security consideration;
synchronizing an execution of one of the first application in the first session and the second application in the second session with an execution of the other of the first application in the first session and the second application in the second session in response to performing the execution of the other of the first application in the first session and the second application in the second session;
controlling permissible and non-permissible interactions between the first application in the first session and the second application in the second session through a predefined channel that defines a permissible transfer of data between the first session and the second session, the predefined channel protecting the first session and the second session against impermissible transfer of data between the first session and the second session;
receiving a request to execute a third application;
determining whether the third application complies with at least one of the first set of security considerations of the first session and the second set of security considerations of the second session; and
in response to determining that the third application does not comply with at least one of the first set of security considerations of the first session or the second set of security considerations of the second session:
creating, on the computing device, a new session comprising a third set of security considerations with which the third application complies, and
executing the third application in the new session.

37. The memory device as described in claim 36, wherein the predefined channel allows automatic routing of data between the first session and the second session without active monitoring of the automatically routed data by the computing device.

* * * * *